F. EMMENEGGER.
COMBINATION AUTOMOBILE TIRE TOOL.
APPLICATION FILED SEPT. 13, 1920.
1,384,385.
Patented July 12, 1921.
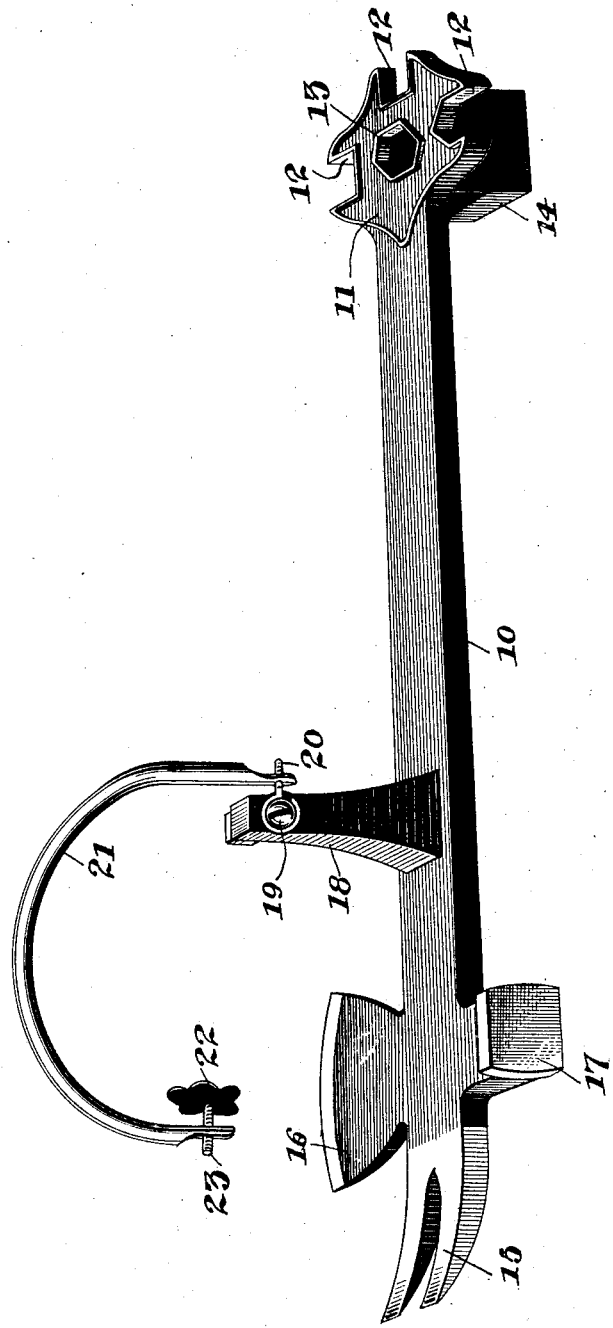
WITNESSES
Geo. V. Hall.
INVENTOR
Frank Emmenegger.
BY
ATTORNEYS

UNITED STATES PATENT OFFICE.

FRANK EMMENEGGER, OF ST. LOUIS, MISSOURI.

COMBINATION AUTOMOBILE-TIRE TOOL.

1,384,385.   Specification of Letters Patent.   Patented July 12, 1921.

Application filed September 13, 1920. Serial No. 409,810.

*To all whom it may concern:*

Be it known that I, FRANK EMMENEGGER, a citizen of the United States, and a resident of St. Louis, in the State of Missouri, have invented certain new and useful Improvements in Combination Automobile-Tire Tools, of which the following is a specification.

My present invention relates generally to combination tools, and more particularly to a combination tire tool adaptable for use in taking off and replacing tires and applicable alike to what are known as "straight side" tires in connection with demountable rims and "clincher" type tires of other rims.

In the accompanying drawing which forms a part of this specification and illustrates the invention, the figure is a perspective view of my improved combination tool.

Referring now to this figure I propose a tool embodying an elongated rectangular shank 10 havng a head at one end embodying an enlargement 11 provided with endwise and laterally opening nut-engaging recesses 12 and having therethrough a nut-engaging opening 13 and a laterally projecting nut-engaging socket member 14, these several recesses, openings, and sockets being proportioned to accommodate wheel and rim-holding nuts encountered in wheels of standard make.

The opposite end of the shank 10 is also headed, this latter head including a terminal bifurcated and laterally curved claw 15 capable of use like the conventional tire iron, and having in addition to the claw 15 a laterally extending blade 16 shaped like a hatchet blade and a laterally projecting striking head 17 opposite the blade 16, both of which may be utilized in releasing and refastening demountable rims of known construction.

Intermediate these two opposite end heads of the shank 10, one of which heads functions as a handle whenever the other head is in use, and at a point nearer to the claw end, the shank 10 has an upright post 18 transversely through the upper end of which is extended a bolt 19. Swiveled upon this bolt is a screw-eye 20 engaged through one end of a tire removing and replacing rod 21, which is curved in substantially the inverted U-shape shown, with respect to the shank 10, and has a scalloped tire-engaging disk 22 adjustably connected to its free end by a screw 23 supporting the disk.

The free end of the tire-engaging rod 21, with its tire-engaging disk 22, is thus swingable with the screw-eye 20, toward and away from the claw end of the shank 10, so that it is capable of being shifted over a tire when the claw 15 is pressed inwardly between the tire and the rim, in this way permitting the tire to be shifted off of the rim by downward pressure upon the opposite end of the shank, or shifted on to the rim by pressure in the opposite direction.

I claim:

A tool of the character described comprising a straight, flat shank having a curved tapering tire lifting end, a post rigidly upstanding from the shank at a point spaced from said end, and an inverted U-shaped tire embracing member in a single piece pivoted at one end to said post and having its opposite free end shiftable on said pivot toward and away from the said end of the shank, and a tire engaging disk having a shank threaded laterally through the free end of said tire engaging member, as described.

FRANK EMMENEGGER.